United States Patent Office 3,042,627
Patented July 3, 1962

3,042,627
METHOD OF PREPARING PLATINUM METAL-ALUMINA CATALYST
Carl D. Keith, Munster, Ind., and William P. Hettinger, Jr., Hinsdale, Ill., assignors, by mesne assignments, to Engelhard Industries, Inc., Newark, N.J., a corporation of Delaware
No Drawing. Filed June 7, 1957, Ser. No. 664,161
7 Claims. (Cl. 252—441)

This invention relates to an improved platinum metal-alumina catalyst. More particularly, this invention pertains to a novel method of producing a platinum metal-alumina hydroforming catalyst having good activity and aging properties and being particularly characterized by having a low halogen ion content.

In the past, the reforming of petroleum hydrocarbons, e.g. straight run naphtha, which includes reactions such as dehydrogenation, isomerization, dehydrocyclization and hydrocracking, has been carried out by contacting the petroleum fraction with a hydrogen-containing gas and an alumina based catalyst containing platinum. The conditions of such a process are usually chosen so that there is a net production of hydrogen.

Numerous methods of preparing catalysts for use in the reforming operations have been set forth, the most predominant one being the in-situ method wherein a slurry of alumina hydrate is mixed with chloroplatinic acid and hydrogen sulfide in order to deposit the platinum on the alumina. Another method which has been proposed is the so-called "sol" method wherein an alumina hydrate slurry is admixed with a sol formed by combining hydrogen sulfide with chloroplatinic acid in an aqueous medium. In both of these methods the platinum-alumina catalyst is finished by generally recognized procedures such as drying in order to remove the free water and calcination in order to remove water of hydration until activated or gamma alumina is obtained.

In these procedures the platinum has usually been supplied as a chlorine-containing compound such as the above-mentioned chloroplatinic acid or others such as platinum chloride. An intrinsic difficulty results in the use of such chloro compounds in that the chloride ions which are released by the action of the $H_2S$ become sorbed on the alumina base and are very difficult to remove resulting in a corrosive effect upon the reforming units over extended periods of operation which may necessitate plant shutdown in order to replace the corroded equipment. Thus, it is desired to produce such a platinum-alumina catalyst which would have a low halogen ion content and yet retain a high rate of activity and a sufficient life to provide a reasonable low unit catalyst cost per barrel of charge stock processed.

In the past numerous methods have been attempted to remove the halogen sorbed on the alumina base with varying results, the most generally accepted method being the washing of the platinum-alumina catalyst with deionized water for a period of time sufficient to decrease the chloride ion concentration to the desired level. This method has obvious disadvantages in that it becomes very expensive to rehandle and reprocess the catalyst and there is the possibility that some of the expensive platinum will be lost in the processing.

In accordance with the present invention, we have found that the above difficulties can be overcome if a bromoplatinum or iodoplatinum compound is used as the source of platinum rather than the usual chloroplatinum compound. By proceeding in this manner, a catalyst will result, upon subsequent drying and calcining, which has good activity and aging properties and which contains low concentrations of halogen. Compounds which are useful in forming the low halogen-containing catalyst of the present invention are those platinum compounds which are combined with a halogen selected from group VIIB of the periodic table and have an atomic number from 35 to 53, i.e. bromine and iodine. Specific examples of such compounds, although not to be considered as limiting can be enumerated as follows: bromo-platinic acid, iodoplatinic acid, platinum bromide, platinum iodide, etc. It is preferred, however, to utilize bromo-platinic acid. The corresponding compounds of the platinum or precious metals other than platinum, such as rhodium, palladium, iridium, etc., can also be used in this invention.

In making the improved platinum-alumina catalyst by the method of the present invention, we have found that the alumina can be derived from any source such as the variety of its hydrates and that the platinum can be deposited on the alumina component at any stage of the manufacture of the catalyst. For example, the alumina can, with advantage, be prepared from a hydrate predominantly in the trihydrate form, i.e. bayerite, randomite or gibbsite; predominantly in the monohydrate form, i.e. boehmite; or hydrous amorphous alumina. Also, the platinum component can be added to activated alumina which is then recalcined, and the catalyst base can contain minor amounts of other materials such as silica. Thus, the platinum impregnation or deposition can be on a wet hydrate, a dried hydrate, a calcined activated alumina or any other form; and during impregnation the support can be in a finely divided form or as pellets provided by tabletting or extruding, if desired. It is preferred, however, that the platinum component be deposited on an alumina hydrate which is composed of about 65–95% trihydrate and about 5 to 35% amorphous hydrous alumina, monohydrate alumina or their mixtures. Methods for preparing this desired hydrate are discussed in the copending applications of Teter, Gring and Keith, Serial No. 288,058, filed May 15, 1952, now abandoned, and Serial No. 489,726, filed February 21, 1955, now Patent No. 2,838,444.

Generally, the preferred hydrogel can be formed, for example, by precipitating the gelatinous hydrous oxide from a solution of a soluble aluminum salt such as aluminum chloride with a precipitating agent such as ammonium hydroxide. After precipitation the alumina hydrogel thus formed can be converted to the desired precursor alumina hydrate by water washing to remove soluble ions and aging in a basic aqueous medium to provide alumina predominating in the trihydrate form. The following example although not to be considered as limiting our invention may more fully illustrate a method of preparing the preferred alumina base.

EXAMPLE I

Twenty-five pounds of aluminum chloride hexahydrate were dissolved in 50 liters of deionized water using a wooden container to prevent contamination. Ammonium hydroxide solution was used as the precipitate and was prepared by mixing equal volumes of 0.90 sp. gr. ammonium hydroxide and deionized water. This was placed in a Pyrex container arranged for addition to the aluminum chloride solution by syphoning. While vigorously stirring the aluminum chloride, the solution of ammonium hydroxide was added at a rate to give a pH of 8.0 to 8.1 in 27–30 minutes elapsed time. The flow of $NH_4OH$ solution was stopped at approximately pH 4.7 because of thickening. With continued stirring fluidity was re-established after which the $NH_4OH$ addition was continued. Stirring was continued for thirty minutes after which the precipitate was separated from the mother liquor by means of a plate and frame press. The filter cake from each of 4 batches was redispersed in 15 gallon portions of deionized water and the hydrogel was washed by repeated filtering and slurrying of the filter cake with pH adjustment to 8 before filtering. The alumina hydrogel was aged for 15 days at room temperature and pH 8. By X-ray analysis the alumina base precursor showed: 25% gibbsite, 30% bayerite, 16% randomite and 20% boehmite plus some amorphous.

Also, any of the conventional methods of depositing the platinum on the alumina can be utilized in the practice of our invention, and generally the platinum component and alumina are mixed in an aqueous medium. For example, bromoplatinic acid can be slurried in water with the alumina without the addition of hydrogen sulfide; a platinum sol can be formed by adding bromoplatinic acid to an aqueous solution of hydrogen sulfide and the resulting platinum sulfide sol commingled with the alumina hydrate; or bromoplatinic acid can be admixed with the alumina and thereafter a saturated aqueous hydrogen sulfide solution added thereto to precipitate the platinum in-situ, the latter being the preferred mode of operation. The platinum-containing compound will usually be mixed with the alumina in amounts to give about 0.1 to 1.5% by weight or more of platinum in the finished catalyst.

After the addition of the platinum component, the platinum-containing alumina can be dehydrated or dried by any of the conventional procedures, in order to remove free water. In general, dehydration is conducted at temperatures ranging from about 225 to 500° F. with the removal of free water. After the dehydration, the catalyst can, if desired, be formed into macrosized particles by tabletting or extruding. Generally, these particles are about 1/16" to 1/2" in diameter and about 1/16" to 1" or more in length. Although these macrosized particles are usually formed after dehydration and before calcination, this, of course, is optional and can be done at any time found most convenient. After dehydration or drying, the alumina is calcined, e.g. at temperatures of about 800 to 1300° F. or more, to provide or preserve its gamma or activated form. Preferably, this is done by contact with a flowing gas stream such as air, nitrogen, etc., and in the operation hydration or combined water is removed.

In the present invention it is essential that the calcination be conducted in an oxidizing atmosphere to remove bromine or iodine from the catalyst and it is preferred to heat the catalyst from dehydration to calcination temperature in an inert atmosphere. For example, the catalyst can be dehydrated and calcined in air or another oxidizing medium or the catalyst can be dehydrated in an inert atmosphere such as nitrogen, heated to calcination temperature in an inert atmosphere and calcined in air or another oxidizing medium, the latter being the preferred mode of operation. The time required for calcination will be dependent upon the temperature and the rate of air flow.

In order to more fully illustrate the improvements of the present invention, two catalysts were prepared using, respectively, bromoplatinic acid and chloroplatinic acid as the source of platinum for a study of their relative activity and life under different calcination conditions.

In these catalysts an alumina hydrogel was employed which contained 0.10% chlorine and 0.002% iron on an ignited weight basis. The hydrate analyzed 6% amorphous hydrous alumina, 18% boehmite, 40% bayerite, 24% randomite, 12% gibbsite. This alumina hydrogel was mixed with an aqueous solution of bromoplatinic acid in amounts to give about 0.6% platinum in the final catalyst. The platinum was precipitated by mixing a saturated aqueous solution of hydrogen sulfide with the slurry. The pH of the slurry was 6.0 after the bromoplatinic acid and hydrogen sufide addition. The resultant catalyst slurry was drum dried at about 110° C., mixed with water and extruded on a 2" extruder to tablets of 1/16" diameter.

The second catalyst was prepared substantially as described above using, however, chloroplatinic acid as the source of platinum rather than bromoplatinic acid. The relative activity and life of portions of these two catalysts in the reforming operation were compared with different calcination conditions being used to prepare the separate portions of catalyst. The conditions of the isothermal calcining unit and the relative data for the calcined catalyst are reported in Table I below.

Table I

| Catalyst Description | Platinum From $H_2PtCl_6$, 0.6% Pt | | |
|---|---|---|---|
| Run Number | 1 | 2 | 3 |
| Dehydration Period (Includes an Initial Calcination Period): | | | |
| Temperature, °F | 80–900 | 80–900 | 80–1,100 |
| Time, hours [1] | 2⅔ | 2 | 2¼ |
| Atmosphere [3] | Dry Air | Dry $N_2$ | Wet $H_2$ |
| VHSV [4] | 750 | 750 | 50 |
| Calcination Period: | | | |
| Temperature, °F | 900 | 900 | 1,100 |
| Time, hours [6] | 3⅓ | 4 | 3¾ |
| Atmosphere [3] | Dry Air | Dry Air | Wet $H_2$ |
| VHSV | 750 | 750 | 50 |
| Analysis of Calcined Catalyst, Weight Percent: | | | |
| Cl | 0.68 | | 0.61 |
| Br | | | |
| S | | 0.10 | |
| V.M. | 3.26 | | 1.14 |
| Physical Properties of Calcined Catalyst: | | | |
| Area, M²/Gm | 472 | 463 | 199 |
| Crush, Lbs | 22.4 | 20.7 | 12.8 |
| Bridge Strength, Ozs | | 36.3 | 29.3 |
| Accelerated Activity Test in Reforming Petroleum Naphtha: [5] | | | |
| Initial Gas Make, Ft.³/Bbl | 1,360 | 1,330 | 1,370 |
| Percent Gas Decline | 23 | 27 | 22 |
| Relative Activity | 80 | 80 | 85 |
| Relative Life | 111 | 107 | 151 |

| Catalyst Description | Platinum From $H_2PtBr_6$, 0.6% Pt | | |
|---|---|---|---|
| Run Number | 4 | 5 | 6 |
| Dehydration Period (Includes an Initial Calcination Period): | | | |
| Temperature, °F | 80–900 | 80–900 | [2]80–1,100 |
| Time, hours [1] | 2¼ | 2½ | 4 |
| Atmosphere [3] | Dry Air | Dry $N_2$ | Wet $H_2$ |
| VHSV [4] | 750 | 750 | 50 |
| Calcination Period: | | | |
| Temperature, °F | 900 | 900 | 1,100 |
| Time, hours [6] | 3¾ | 3½ | 2 |
| Atmosphere [3] | Dry Air | Dry Air | Wet $H_2$ |
| VHSV | 750 | 750 | 50 |
| Analysis of Calcined Catalyst, Weight Percent: | | | |
| Cl | 0.03 | 0.09 | 0.10 |
| Br | 0.05 | 0.05 | 1.20 |
| S | 0.1 | 0.13 | <0.02 |
| V.M. | 3.50 | 3.47 | 2.51 |
| Physical Properties of Calcined Catalyst: | | | |
| Area, M²/Gm | 461 | 469 | 208 |
| Crush, Lbs | 24.3 | 21.0 | 12.8 |
| Bridge Strength, Ozs | | | 26.8 |
| Accelerated Activity Test in Reforming Petroleum Naphtha: [5] | | | |
| Initial Gas Make, Ft.³/Bbl | 1,280 | 1,460 | 1,360 |
| Percent Gas Decline | 26 | 33 | 40 |
| Relative Activity | 69 | 81 | 76 |
| Relative Life | 81 | 109 | 90 |

[1] Approximate times to traverse temperature range indicated.
[2] Inadvertently the temperature was lined out at 900° F. for ca. 1½ hours prior to increasing temperature to 1100° F.
[3] In "wet" $H_2$ experiments, the $H_2$ was saturated with $H_2O$ at room temperature.
[4] Volumes of gas (STP) per volumes of catalyst per hour.
[5] The reforming conditions were: 940° F., 200 p.s.i.g., 15 WHSV, 5 : 1 hydrogen-containing gas to naphtha mole ratio and the naphtha feed had a RON (neat) of about 40 and an ASTM distillation range of about 235–360° F.
[6] Approximate times.

A study of these data establish that the catalyst prepared with bromoplatinic acid is more sensitive to different dehydration or calcination conditions than is the catalyst prepared with chloroplatinic acid. For example, a comparison of run No. 1 (prepared with $H_2PtCl_6$) and run No. 4 (prepared with $H_2PtBr_2$) shows that when the two catalysts are dehydrated and calcined in air the catalyst prepared with $H_2PtCl_6$ has a higher life and activity. The reason for this is probably associated with the fact that the bromine which is liberated from the catalyst during the dehydration in air is a strong oxidizing agent and tends to oxidize and redisperse the platinum particles to unfavorable positions on the alumina. In run No. 5 ($H_2PtBr_6$) and run No. 2 ($H_2PtCl_6$) the dehydration was effected in an inert atmosphere of nitrogen and the calcination took place in an oxidizing atmosphere. In these runs, there is no substantial difference in the relative activity and life of the two catalysts. Apparently, decomposing the platinum sulfide in the inert atmosphere allowed the platinum particles to be deposited on the alumina at the most desirable points before it could be redispersed by the bromine upon its subsequent oxidation during calcination. Note, however, in both of the above runs wherein the catalyst was prepared with $H_2PtBr_6$, the bromine was substantially removed during the dehydrating and calcination treatment whereas the chlorine was not substantially removed. In the runs wherein both catalysts were dehydrated and calcined in an inert atmosphere (wet $H_2$) the catalyst prepared with $H_2PtCl_6$ shows a much higher relative activity and life. Also, the bromine was not removed from the catalyst under these conditions. It can be seen, therefore, that if a platinum-alumina catalyst having a low halogen content is desired the platinum can be introduced as $H_2PtBr_6$ and dried and calcined in flowing air or the catalyst can be dried in an inert atmosphere and calcined in air, the latter being the preferred mode of operation since a catalyst results having a relative life and activity comparable to those catalysts prepared with $H_2PtCl_6$ and still the former possesses a low halogen ion content.

Several catalysts were prepared in accordance with the teachings of the present invention in order to further evaluate their relative activity and aging rate. The methods of preparing these catalysts and the data pertinent to their testing are reported in the following examples.

EXAMPLE II 1,555 grams of an aqueous alumina hydrate slurry (the hydrate contained greater than 76% of trihydrate) containing 150 grams $Al_2O_3$ were mixed with 450 ml. of deionized water in a 4-liter beaker and stirred vigorously for 30 minutes at a pH of 7.3. While the stirring was continued, 93.8 ml. of bromoplatinic acid solution containing 0.9 gm. of platinum was diluted with 35 ml. of deionized water and added to the alumina hydrate slurry over a 5-minute period. The stirring was continued for an additional 30 minutes. The resultant slurry was then light yellow in color and had a pH of 6.8. The pH of this slurry was gradually raised to 7.15 by adding a $1NH_4OH:4H_2O$ solution and stirring. One ml. of this solution was required. The resultant slurry was dried in a Pyrex tray in an Aminco forced air oven at a temperature of 120° C. After drying overnight, the top of the catalyst in the tray was light yellow indicating some platinum migration. The dried catalyst was ground to pass −20 mesh, and tabletted to ⅛″ x ⅛″ tablets. The resultant tablets were calcined in a 50 mm. Vycor reactor under the following conditions. The catalyst was heated from room temperature up to about 900° F. in about 2 hours with dry gas flow of 300 liters/hour of prepurified nitrogen and 5 liters/hour of dry air. This gas flow and heat was continued for about 7 hours. The dry air-nitrogen mixture was cut out and the calcination continued for 3 hours at 900° F. in dry air flowing at 300 liters/hour. The catalyst was cooled to room temperature in a stream of flowing dry air.

This catalyst upon analysis contained 0.07% bromide and 0.02% chloride. A calculated bromide analysis for the $H_2PtBr_6$ used indicates that the catalyst would contain about 1.47% bromide if none were lost during the calcination, indicating that about 95% was evolved during the calcination.

The reforming activity of this catalyst evaluated using a straight run naphtha feed stock of about 37 RON. (neat) at 500 p.s.i.g., a WHSV of 4.4 and a $H_2$-containing gas/hydrocarbon mole ratio of 5. The following data were obtained at the indicated temperature.

|  | 890° F. | 925° F. |
|---|---|---|
| Wt. Percent Stabilized Reformate | 87.1 | 79.1 |
| R.M.O. No. (neat) | 76.7 | 89.0 |

EXAMPLE III

A drum dried alumina hydrogel containing 0.26% chlorine and 0.004% iron (ignited weight basis) and analyzing 2% amorphous, 19% boehmite, 48% bayerite, 18% randomite and 13% gibbsite, was dried at 150° C. in a Steiner-Ives oven, ground in a Fitz mill to −40 mesh. The dried catalyst was calcined for 5 hours in the Steiner-Ives oven at 340° C. to 16% boehmite, 5% trihydrate and 90.5% $Al_2O_3$. After the alumina precursor had been partially activated by the above calcination procedure the catalyst was mixed with an aqueous bromoplatinic acid solution in an amount to give a final platinum content of about 0.6%; the pH of the slurry was 5.4. The resultant catalyst slurry was filtered and dried at about 110° C. The dried catalyst was mixed with $H_2O$ and extruded on a 2″ extruder to obtain pellets of a diameter of ¹⁄₁₆″. The thus formed pellets were calcined in flowing dry air at about 900° F. Upon analysis the calcined catalyst contained 0.26% chloride and 0.15% bromide (ignited weight basis) and 3.73% V.M. The data regarding the performance of the catalyst in reforming straight run petroleum naphtha is as follows:

Relative activity _____ 71.
Relative life _____ 117.
Initial gas _____ 1400 ft. ³/bbl.
Percent gas decline _____ 31.

In the reforming of gasoline boiling range hydrocarbons our low halogen content catalyst containing about 0.2 to 1.5% or more platinum can be employed under the usual processing conditions, for example, 800 to 1000° F.; 100–750 p.s.i.; 1–10 WHSV and 2–20 moles of hydrogen per mole of hydrocarbon. The hydrogen can be supplied to the reaction zone by recycling hydrogen rich tail gases. The catalyst can be employed as a fixed or moving bed or in a fluidized system. Most often, the system is comprised of a plurality of adiabatic reactors with a fixed catalyst bed in each reactor and a feed heater before each reactor. The liquid product can be separated from the reaction effluent as in an atmospheric pressure flash drum.

When the processing cycle has continued for a time so that the liquid product of desired octane number can no longer be obtained at feasible temperatures and economically sound yields, the catalyst can be regenerated through the removal of a substantial portion of the carbonaceous material deposited during processing. In general, this result can be accomplished through contact with an oxygen-containing gas at temperatures in the range of from about 800 to 1000° F. In the regenerating step, the oxygen content of the combustion supporting gases can be limited if necessary to avoid excessive temperatures but if temperature limitations permit, we prefer to employ air during the last part of the regeneration period. After regeneration and reduction by contact with free hydrogen, the catalyst can again be employed for processing in the reforming operation. This process of regenerating cycle can be repeated until the catalyst when regenerated will no longer meet the requirements of a given situation as to octane yield relationship of the liquid product.

It is claimed:
1. A method of preparing a platinum metal-alumina catalyst characterized by a low halogen ion content which comprises commingling alumina in an aqueous medium with a platinum metal-halogen containing compound wherein the halogen of said platinum metal compound is selected from group VIIB of the periodic table having an atomic number from 35 to 53, drying the catalyst, heating to a calcination temperature of at least 800° F. in an inert atmosphere, and further calcining the catalyst in an oxidizing atmosphere to reduce halogen to a low concentration.

2. A method in accordance with claim 1 wherein the platinum metal-halogen compound is bromoplatinic acid.

3. A method of preparing a platinum metal-alumina catalyst characterized by a low halogen ion content which comprises commingling alumina in an aqueous medium with a platinum metal-halogen containing compound wherein the halogen of said platinum metal compound is bromine, drying the resulting mixture, heating to a calcination temperature of at least 800° F. in an inert atmosphere, and calcining the material in an oxidizing atmosphere to remove halogen.

4. A method in accordance with claim 3 wherein the platinum metal-halogen compound is bromoplatinic acid.

5. The method of claim 4 wherein the inert atmosphere is nitrogen and the oxidizing atmosphere is air.

6. A method of preparing a platinum-alumina catalyst characterized by a low halogen content which comprises commingling in an aqueous medium bromoplatinic acid with an alumina hydrate in amounts to give about .1 to 1.5% by weight platinum in the finished catalyst, said alumina hydrate containing about 65 to 95% of alumina trihydrate, contacting the thus formed alumina hydrogel-bromoplatinic acid slurry with hydrogen sulfide to precipitate the platinum component, drying the thus formed material heating to a calcination temperature of at least 800° F. in an inert atmosphere, and calcining the material in an oxidizing atmosphere to remove halogen.

7. The method of claim 6 in which the inert atmosphere is nitrogen and the oxidizing atmosphere is air.

References Cited in the file of this patent
UNITED STATES PATENTS

| | | |
|---|---|---|
| 2,623,860 | Haensel | Dec. 30, 1952 |
| 2,746,937 | Hunter et al. | May 22, 1956 |
| 2,781,323 | Hunter | Feb. 12, 1957 |
| 2,840,514 | Brennan et al. | June 24, 1958 |
| 2,848,377 | Webb | Aug. 19, 1958 |
| 2,867,588 | Keith | Jan. 6, 1959 |